July 13, 1948. W. M. WALLACE 2,445,162
COMB TYPE COTTON HARVESTER
Filed Nov. 28, 1944 5 Sheets-Sheet 3

Inventor
William M. Wallace,
By J. Stanley Burch
Attorney

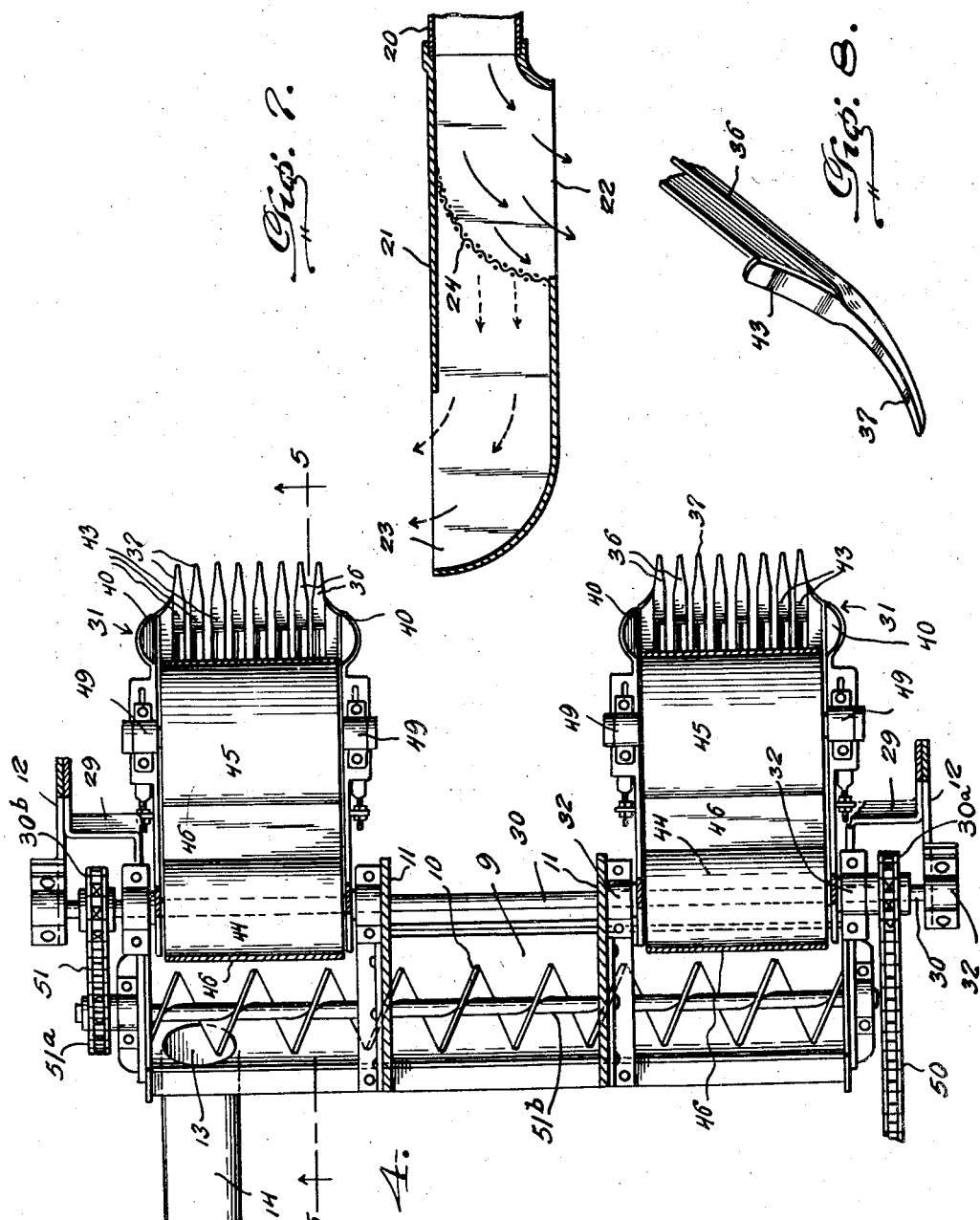

July 13, 1948. W. M. WALLACE 2,445,162
COMB TYPE COTTON HARVESTER
Filed Nov. 28, 1944 5 Sheets-Sheet 5
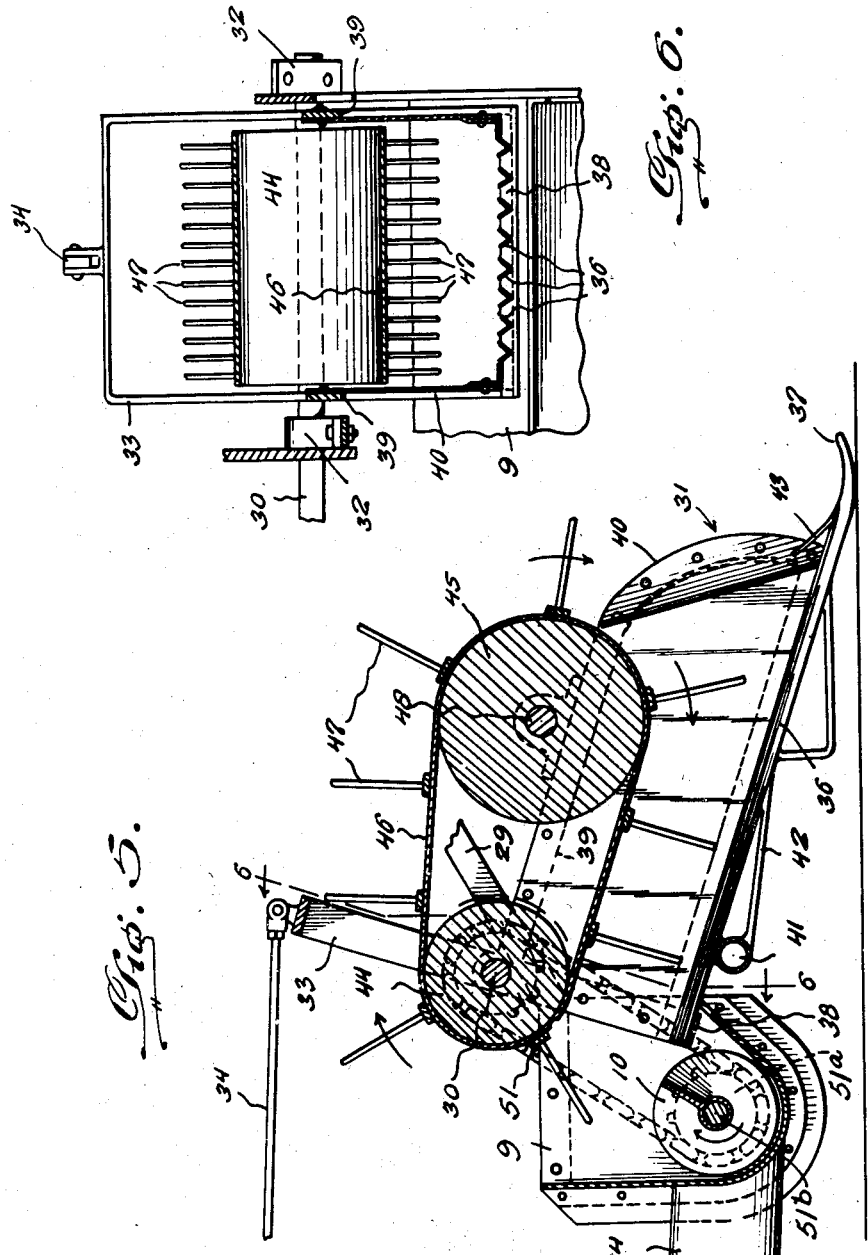
Inventor
William M. Wallace,
By 
Attorney

Patented July 13, 1948

2,445,162

UNITED STATES PATENT OFFICE 2,445,162

COMB-TYPE COTTON HARVESTER

William M. Wallace, Lubbock, Tex., assignor to William A. Robinson, Lubbock, Tex.

Application November 28, 1944, Serial No. 565,475

4 Claims. (Cl. 56—34)

1

This invention relates to cotton harvesters of the type embodying mechanical means to strip the cotton bolls from the standing plants, and means to deliver the cotton bolls from the stripping means into a receiving vehicle disposed behind the harvester.

The primary object of the present invention is to provide a cotton harvester of the above type embodying a conventional agricultural tractor having stripping and conveying means mounted thereon in a novel manner and so constructed and arranged as to provide a compact and highly efficient machine for the intended purpose.

A further object is to provide a machine of the above kind embodying boll stripping scoops mounted at opposite sides of the forward portion of the tractor so that the bolls may be simultaneously stripped from the plants in two adjacent rows.

Another object is to provide a machine of the above kind in which a screw conveyor is mounted transversely of the tractor behind the stripping scoops to receive the bolls from the latter, and in which pneumatic conveying means is provided to deliver the bolls from the screw conveyor to the trailing receiving vehicle.

Still further objects are to provide a novel form of stripping scoop; to provide a means driven from a rear wheel of the tractor for bending the plants rearwardly and conveying the stripped bolls rearwardly on and from the stripping scoops to the screw conveyor; and to provide the pneumatic conveying means with a blower driven from the side power-take-off of the tractor.

More specific objects and features of the invention will become apparent from the following description, when considered in connection with the accompanying drawings.

The invention consists in the novel form, combination and arrangement of parts hereinafter more fully described, shown in the drawings and claimed.

In the drawings, wherein like reference characters indicate similar parts throughout the several views:

Figure 4 is an enlarged fragmentary section taken on line 4—4 of Figure 1.

Figure 5 is a section on line 5—5 of Figure 4.

Figure 6 is a section on line 6—6 of Figure 5.

2

Figure 1:
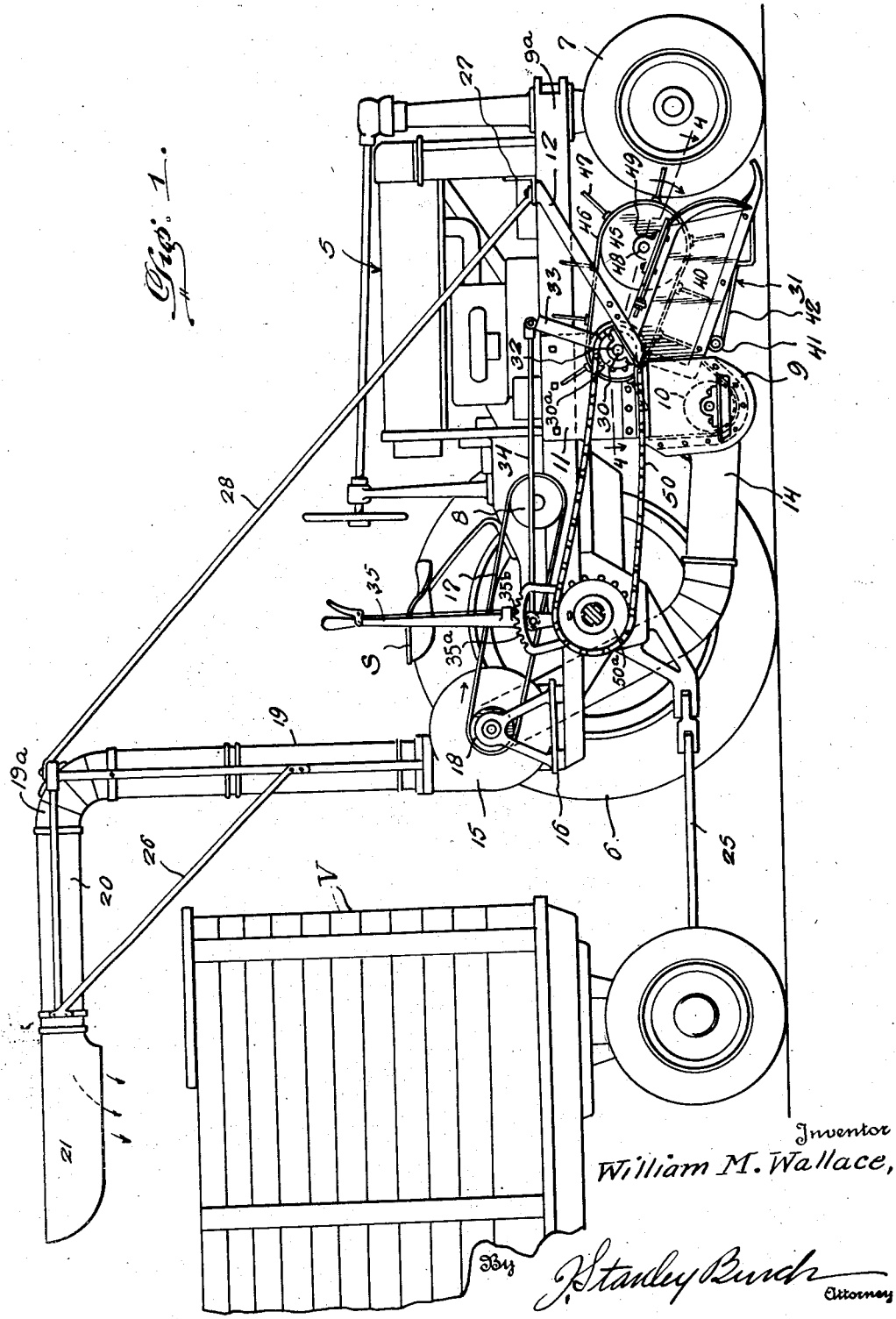
Figure 1 is a view partly in section and partly in side elevation, of a cotton harvester constructed in accordance with the present invention and towing a receiving vehicle.
Figure 2:
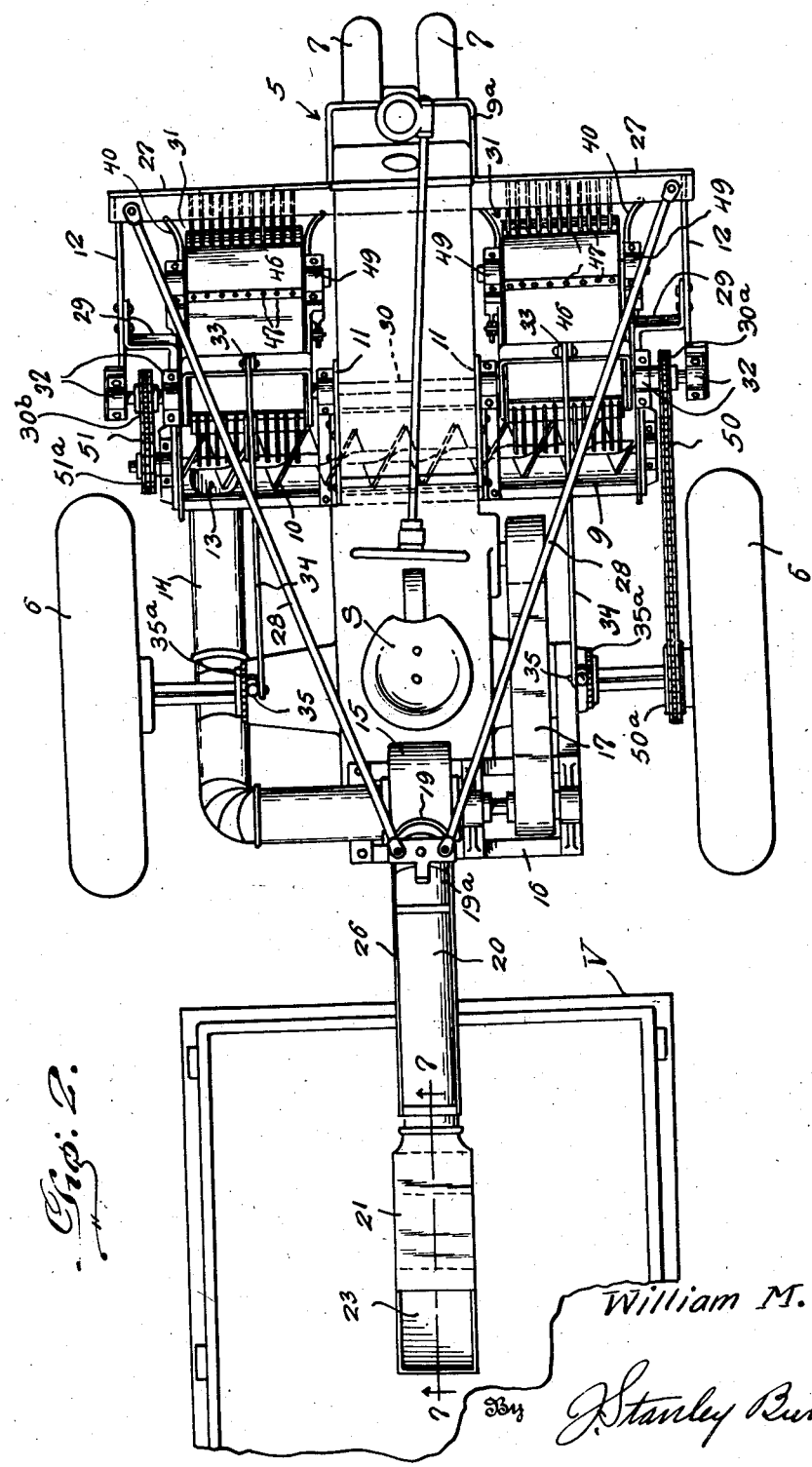
Figure 2 is a top plan view thereof.
Figure 3:
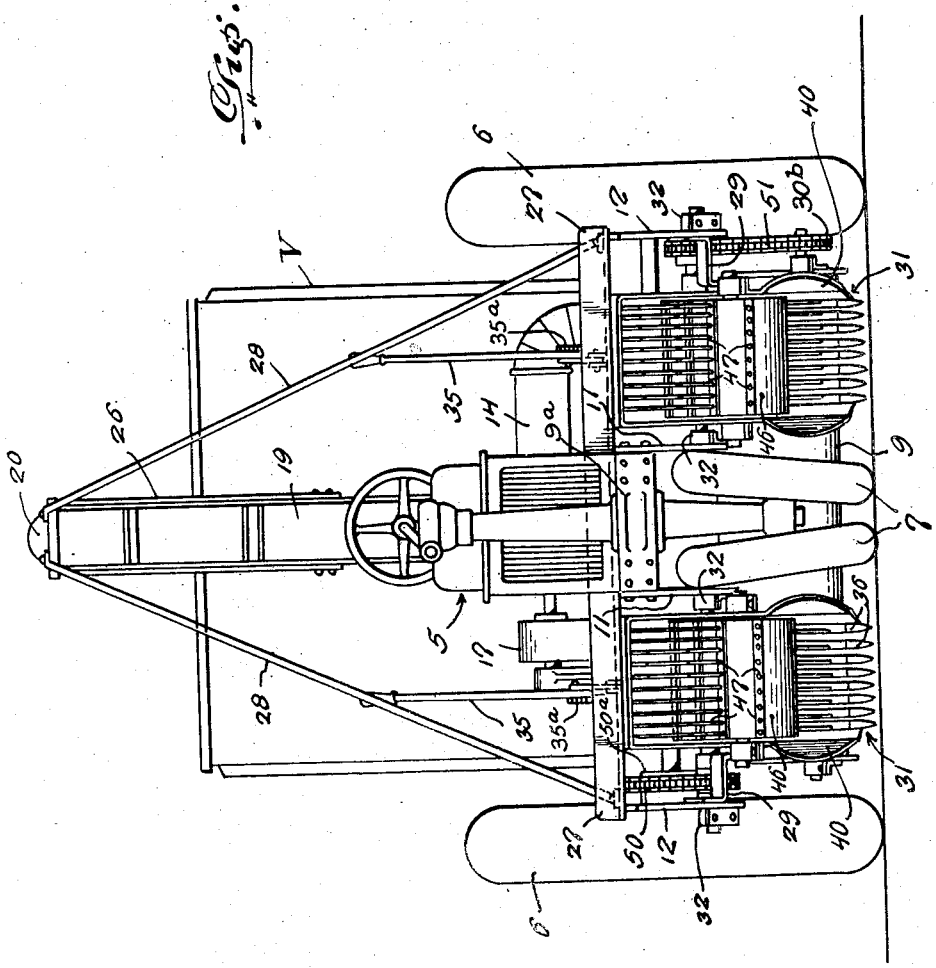
Figure 3 is a front elevational view of the same.

Figure 7 is an enlarged section on line 7—7 of Figure 2.

Figure 8 is a fragmentary perspective view of a finger of one of the stripping scoops.

Referring in detail to the drawings, 5 indicates a conventional agricultural tractor having driven rear wheels 6, front steering wheels 7, and a side power take-off pulley 8.

In accordance with the present invention, the trough 9 of a screw conveyor is rigidly mounted transversely of and beneath the frame 9a of the tractor in front of the rear wheels 6, and this conveyor includes a rotary conveying screw 10 operable in the trough 9 and extending from end to end of the latter. This conveyor projects beyond opposite sides of the tractor frame and is mounted in place by bracket plates 11 secured to the tractor frame and attached to the top of the trough 9, and bracket arms 12 to be later described in more detail. The trough 9 has a rear outlet 13 at one end, and the intake pipe 14 of a blower 15 is connected to this outlet. Blower 15 is mounted on a platform 16 rigidly secured on the rear of the tractor frame, and a belt 17 provides a driving connection between the power take-off pulley 8 and a pulley 18 secured on the shaft of blower 15. Blower 15 has an upwardly extending rotatable discharge pipe 19 that is provided with a horizontally swinging rearward extension 20 having a discharge spout 21 in its rear end. Spout 21 has a forward bottom outlet 22 for the cotton bolls and a rear top outlet 23 for air and dust, a screen 24 being placed in the spout at the rear of outlet 22 to direct the bolls downwardly through the latter into the receiving vehicle V behind the machine. This vehicle may be coupled at 25 to the machine so as to be towed by the latter, and braces may be provided between the pipe 19 and its extension 20, as at 26. Rigidly secured to the frame of the tractor, forwardly of the screw conveyor, are laterally projecting arms 27, and guy rods 28, connecting the top 19a of pipe 19 with the outer ends of these arms to brace the pipe 19 in proper vertical position. The arms 27, in the installation shown, are the ends of a cross bar bolted on the frame of the tractor directly behind the radiator of the latter. The bracket arms 12 extend forwardly and upwardly and are fixed to the arms 27 at their forward ends and to the ends of the trough 9 by brackets 29 attached to their rear portions.

Journaled on a shaft 30, at their rear upper portions, are vertically swinging boll-stripping scoops 31 that are arranged at opposite sides of the tractor frame forwardly of the end portions of trough 9 so as to discharge into the latter. Shaft 30 is journaled in bearings 32 secured to the bracket arms 12, plates 11 and brackets 29. Bails 33 are rigid with and rise from the rear ends of the scoops 31, and these bails are connected by links 34 with hand levers 35 mounted beside the driver's seat S. Levers 35 are used to swing the scoops 31 and thereby adjust the forward ends of the latter at the required distance above the ground, said levers being provided with ordinary segment 35a and latch 35b means for releasably securing them in adjusted position, as shown. The shaft 30 is disposed above the forward portion of the trough 9 so that scoops 31 will always discharge into said trough.

The scoops 31 are alike, and each consists of a plurality of spaced teeth 36 each formed of angle iron and disposed to provide a trough-like member that is flattened and pointed at its forward end, as at 37. These teeth are fixed at their rear ends to a cross member 38 connecting vertical side frames 39 that are secured to and rise from the teeth at the sides of each scoop. Side plates 40 are attached to the frames 39, and an open-ended scoop is thus formed, with the forward ends of the teeth 36 projecting forwardly beyond the plates 40. Near their rear ends, the teeth 36 are connected to a cross member 41, preferably in the form of a pipe welded to the under sides of the teeth. Braces 42 are provided between each tooth and the cross member 41, and upwardly and rearwardly extending barb-like arms 43 are provided on the forward ends of the teeth. When the machine moves forward, the stalks of the plants pass between the teeth 36 with the latter beneath the foliage. Due to the inclined position of the teeth, they will gradually engage the stalks at higher levels, stripping the foliage from them and retaining the bolls. Any bolls that roll down the teeth are stopped by the arms 43.

An endless fingered conveyor is arranged in each scoop for conveying the stripped bolls rearwardly into the trough 9, such conveyor including drums 44 and 45 and an endless belt 46 passing around said drums and having fingers 47 projecting therefrom. Drums 44 are secured on the ends of shaft 30, and drums 45 are secured on shafts 48 journaled in bearings 49 secured on the side frames 39 of the scoops forwardly of drums 44. The shaft 30 is provided with a fixedly connected sprocket wheel 30a driven by a chain 50, which in turn, is driven by a sprocket wheel 50a, fixed to one of the driven wheels 6 of the tractor. The shaft 30 is also fixedly connected to a sprocket wheel 30b which drives a sprocket chain 51. The chain 51 is operatively connected to a sprocket wheel 51a fixed to the shaft 51b of the conveyor 10. The cross members 41 cause final stripping of the plants as they pass downwardly from between the fingers 36 at this point.

In use, the machine is driven ahead with the scoops 31 in line with two adjacent rows of plants, and the teeth 36 receive the stalks of the plants between them at points beneath the foliage. As the machine proceeds, the conveyors in the scoops press the plants rearwardly and downwardly, and then convey the bolls rearwardly and into the trough 9 as said bolls are stripped from the plants in the manner previously described. The bolls are conveyed to one end of trough 9 by screw 10, where they pass through the outlet 13, intake pipe 14, blower 15, outlet pipe 19, and its extension 20, and the discharge opening 22 of spout 21 into the vehicle V. Distribution of the bolls in the vehicle V is facilitated by swinging the extension 20 laterally as permitted by rotation of pipe 19.

From the foregoing description, it is believed that the construction and operation, as well as the advantages, of the present invention will be readily understood and appreciated by those skilled in the art. Minor changes may be made in details shown and described, such as fairly fall within the spirit and scope of the invention as claimed.

What I claim is:

1. For use in a cotton harvester of the type having a toothed cotton boll stripping scoop and conveying means operatively associated therewith for conveying stripped cotton bolls rearwardly along the teeth of the scoop, the improvement in which the scoop comprises supporting means extending transversely of the scoop and connected to the rear end portions of the teeth maintaining the teeth spaced apart less than the diameter of the cotton bolls being harvested, said teeth inclining downwardly and extending forwardly from said transverse supporting means, each tooth being channel-shaped in cross section from said supporting means to the forward end portion of the tooth and having the mouth of the channel at the top of the tooth, and a barb-like arm of substantially the same width as each tooth extending from the top of the forward end portion thereof rearwardly at an acute angle relatively to the tooth.

2. For use in a cotton harvester of the type having a toothed cotton boll stripping scoop and conveying means operatively associated therewith for conveying stripped cotton bolls rearwardly along the teeth of the scoop, and in which said conveying means comprises a rotatable drum arranged above the scoop and rotatable about a horizontal axis, the improvement in which the scoop comprises supporting means extending transversely of the scoop and connected to the rear end portions of the teeth maintaining the teeth spaced apart less than the diameter of the cotton bolls being harvested, means for adjusting the height of the front end of the scoop including members rigidly connected with said supporting means and movable about the axis of said drum, said teeth inclining downwardly and extending forwardly from said transverse supporting means, each tooth being channel-shaped in cross section from said supporting means to the forward end portion of the tooth and having the mouth of the channel at the top of the tooth, and a barb-like arm of substantially the same width as each tooth extending from the top of the forward end portion thereof rearwardly at an acute angle relatively to the tooth.

3. For use in a cotton harvester of the type having a toothed cotton boll stripping scoop and conveying means operatively associated therewith for conveying stripped cotton bolls rearwardly along the teeth of the scoop, the improvement in which the scoop comprises supporting means extending transversely of the scoop and connected to the rear end portions of the teeth maintaining the teeth spaced apart less than the diameter of the cotton bolls being harvested, said teeth inclining downwardly and extending forwardly from said transverse supporting means, each tooth being channel-shaped in cross section from said supporting means to the forward end portion of the tooth and having the mouth of the channel at the top of the tooth, bracing means for the teeth arranged at the bottom thereof and including braces extending lengthwise of the teeth and rigidly secured to the bottoms of the teeth, and a barb-like arm of substantially the same width as each tooth extending from the top of the forward end portion thereof rearwardly at an acute angle relatively to the tooth.

4. For use in a cotton harvester of the type having a toothed cotton boll stripping scoop and conveying means operatively associated therewith for conveying stripped cotton bolls rearwardly along the teeth and within the scoop, the improvement in which the scoop comprises a bar extending transversely of the scoop, connected to the bottoms of the rear end portions of the teeth and maintaining the teeth spaced apart less than the diameter of the cotton bolls being harvested, said teeth inclining downwardly and extending forwardly from said bar, each tooth being substantially V-shaped in cross section from said supporting means to the forward end portion of the tooth and forming a channel having its mouth at the top of the tooth, and a barb-like arm of substantially the same width as each tooth extending from the top of the forward end portion thereof rearwardly at an acute angle relatively to the tooth.

WILLIAM M. WALLACE.

REFERENCES CITED

The following references are of record in the file of this patent:

UNITED STATES PATENTS

| Number | Name | Date |
|---|---|---|
| 325,109 | Naff | Aug. 25, 1885 |
| 954,382 | Edge et al. | Apr. 5, 1910 |
| 1,106,109 | Wilcoxson | Aug. 4, 1914 |
| 1,130,847 | Schofield | Mar. 9, 1915 |
| 1,523,057 | Davis et al. | Jan. 13, 1925 |
| 1,722,747 | Hentz | July 30, 1929 |
| 1,760,312 | Mitchell | May 27, 1930 |
| 1,778,587 | Crumley | Oct. 14, 1930 |
| 1,879,823 | Ray | Sept. 27, 1932 |
| 1,907,467 | Tervo et al. | May 9, 1933 |
| 1,920,418 | Meyercord et al. | Aug. 1, 1933 |
| 2,144,970 | Hall | Jan. 24, 1939 |